United States Patent [19]
Sapir

[11] 3,755,745
[45] Aug. 28, 1973

[54] NOISE DISCRIMINATION APPARATUS
[75] Inventor: Said Sapir, Westlake Village, Calif.
[73] Assignee: International Telephone and Telegraph Corporation, New York, N.Y.
[22] Filed: June 23, 1972
[21] Appl. No.: 265,526

Related U.S. Application Data
[62] Division of Ser. No. 173,459, Aug. 20, 1971, abandoned.

[52] U.S. Cl................. 328/133, 307/215, 307/216, 307/218
[51] Int. Cl. ............................................ H03b 3/04
[58] Field of Search.................... 307/232, 233, 215, 307/218, 216; 328/133, 134

[56] References Cited
UNITED STATES PATENTS
3,206,616   9/1965   Webb................................. 307/232
3,430,148   2/1969   Miki................................ 307/232 X
3,509,476   4/1970   Roth.................................... 328/134
3,514,705   5/1970   Feigleson....................... 307/233 X
3,515,997   6/1970   Babany.............................. 328/134
3,526,841   9/1970   Holmboe et al. ............... 307/233 X Primary Examiner—John S. Heyman
Attorney—C. Cornell Remsen, Jr., Thomas E. Kristofferson et al.

[57] ABSTRACT

A system for producing information pulses including, for example, two magnetic pick-ups spaced apart $nd$, where $n$ is any positive odd integer and $d$ is equal to one-half the spacing between two immediately adjacent teeth of a rotatable ferromagnetic armature. A phase comparison logic circuit is connected from the pick-ups. This circuit is selective and discriminates against voltages induced by vibration, by an internal combustion engine ignition system coil or by other means. The system is useful for providing a velocity analog for any purpose including, but not limited to, an anti-skid braking arrangement for automotive vehicles.

20 Claims, 12 Drawing Figures

NOISE DISCRIMINATION APPARATUS

This is a division of copending application Ser. No. 173,459 filed Aug. 20, 1971, now abandoned. The benefit of the filing date of said copending application is, therefore, hereby claimed for this application.

BACKGROUND OF THE INVENTION

This invention relates to the art of noise discrimination, and more particularly, to apparatus for reproducing a desired signal without reproducing noise that accompanies it.

In the past, it has been the pratice to obtain a pulse analog of the velocity of a rotating shaft by passing a toothed ferromagnetic gear-like structure of a magnetic material adjacent a permanent magnet having a coil therearound. An alternating voltage is, thus, induced in the coil. The frequency of this alternating voltage is then directly proportional to the angular velocity of the moving shaft. This prior art construction suffers from the two serious disadvantages that can increase or decrease the number of cycles of the coil output and thereby give an erroneous velocity analog. For example, vibration can cause the gear-like structure to move back and forth axially toward and away from the permanent magnet. Extraneous alternating signals may, thus, be generated in the coil.

It is conventional to employ a velocity analog device in anti-skid braking systems for automotive vehicles. In this case, it will be appreciated that vibration can be a substantial problem. Further, in the case of anti-skid braking systems, the coil employed with the ignition system of an internal combustion engine can induce a voltage in the magnetic pick-up for developing an analog of the velocities of two braked wheels.

From the foregoing, it will be appreciated that both the vibration and the induced voltage problems of the prior art make it impossible to obtain an accurate velocity analog.

SUMMARY OF THE INVENTION

In accordance with the device of the present invention, the above-described and other disadvantages of the prior art are overcome by discriminating against any noise picked up.

Two permanent magnets and two coils therearound, respectively, may be provided. The permanent magnets are spaced apart a distance such that the voltages induced in the coils, due to the passage of a gear-like structure adjacent thereto, are 180 degrees out of phase with each other. It has been found that with this arrangement, unexpectedly, although signal modulation due to shaft rotation induces a signal, noise generated because of vibration and otherwise can be discriminated against by the use of a logic circuit.

The above-described and other advantages of the present invention will be better understood from the following detailed description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENT

Figure 1:
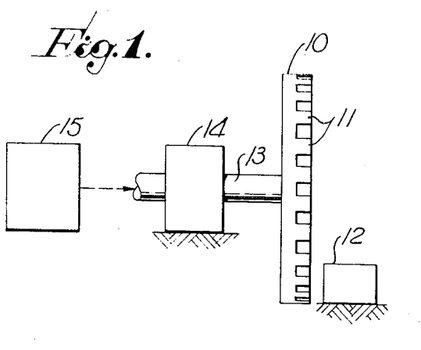
FIG. 1 is a side elevational view of a portion of the structure of the present invention.

In FIG. 1, a gear-like ferromagnetic structure 10 has teeth 11 which pass by a magnetic pick-up 12. Structure 10 may be made of soft iron, if desired. Structure 10 is fixed to a shaft 13 that is journaled in a fixed bearing 14. Shaft 13, thus, is rotatable in bearing 14 but is not slidable therethrough.

As bearing 14 is fixed, so is pick-up 12. A device 14 rotates shaft 13. Typically, structure 10 may be fixed to the wheel of a truck so that an output signal may be generated directly proportional to the angular velocity of the wheel. Structure 10 is shown in a perspective view in FIG. 2.

Figure 3:
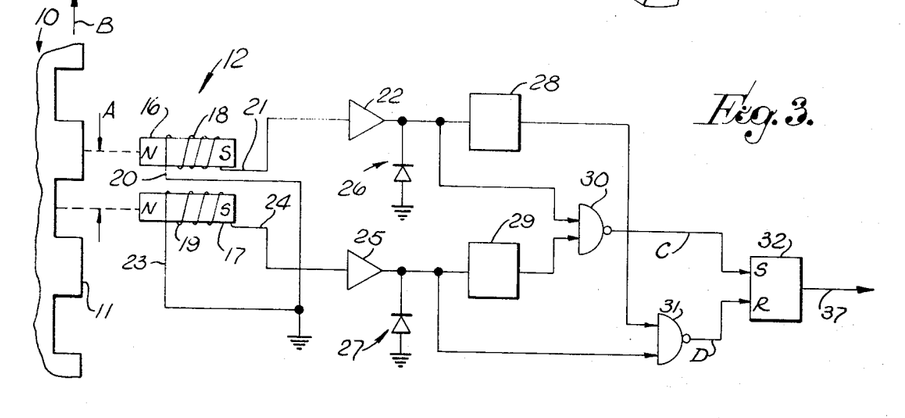
FIG. 3 is a diagrammatic view of one embodiment of the present invention.

As shown in FIG. 3, pick-up 12 includes two permanent magnets 16 and 17 which are specially poled in the same direction. For example, the left ends thereof may both be north poles, and the right ends thereof may both be south poles. However, the left ends of both magnets 16 and 17 may be south poles, if desired.

Magnets 16 and 17 have coils 18 and 19 therearound which are wound in the same direction. Coil 18 has one end turn 20 connected to ground and another end turn 21 connected to the input of an amplifier 22. Coil 19 has one end turn 23 connected to ground and another end turn 24 connected to an amplifier 25. Note will be taken that when each of the teeth 11 of structure 10 has a width equal to the space between teeth, magnets 16 and 17 are spaced a distance A equal to the width of one tooth.

The negative half cycle of the outputs of amplifiers 22 and 25 are shunted to ground through diodes 26 and 27, respectively. Inverters 28 and 29 are connected, respectively, from the outputs of amplifiers 22 and 25. The output of amplifier 22 and the output of inverter 29 are impressed upon an NAND gate 30. The outputs of inverter 28 and amplifier 25 are impressed upon an NAND gate 31. The output of NAND gate 30 is connected to the set input of flip-flop 32. The output of NAND gate 31 is connected to the reset input of flip-flop 32.

Figure 4:
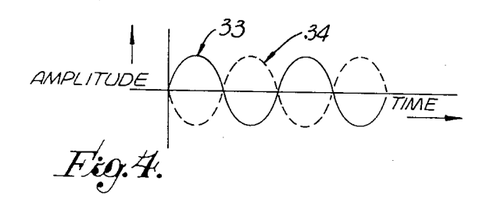
FIGS. 4, 5, 6 and 7 are graphs of waveforms characteristic of the operation of the invention.

Operation of the circuit of FIG. 3 may be better understood from the following description of FIGS. 4-7. If, for example, a signal 33, shown in FIG. 4, is inducted in coil 18 by the passage of teeth 11 of structure 10 contiguous to the magnets 16 and 17 in the direction B, as shown in FIG. 3, another voltage will be induced in coil 19 as indicated at 34 in FIG. 4. Note will be taken that signal 34 is precisely 180 degrees out of phase with the signal at 33.

Figure 5:
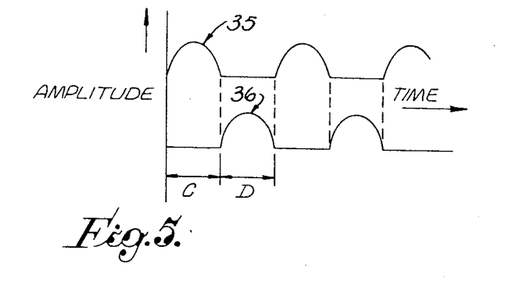

Since diodes 26 and 27 shunt the negative outputs of amplifiers 22 and 25, respectively, the output of amplifier 22 will appear as at 35 in FIG. 5. The output of amplifier 25 will appear as at 36 in FIG. 5.

From the foregoing, even though the waveforms 35 and 36 appear to be a half wave rectified sine wave, the signals at the outputs of amplifiers 22 and 25 may be considered bilevel logic signals. Thus, the output of amplifier 22 may be called P, and the output of amplifier 25 may be labeled Q. The output of inverter 28 is then $\bar{P}$, and the output of inverter 29 is $\bar{Q}$.

NAND gates 30 and 31 were used only because the flip-flop 32 selected required a zero level input to either set or reset terminals to accomplish the desired function. If a flip-flop is employed requiring only high level inputs for set and reset, conventional AND gates may be substituted for NAND gates 30 and 31. At any rate, each of the NAND gates 30 and 31 may be simply an AND gate with an inverter connected from the output thereof.

Note that the input to NAND gate 30 is $P\bar{Q}$ whereas the input to NAND gate 31 is $\bar{P}Q$. This means that flip-flop 32 is set when P is high and Q is low. This occurs during the half period marked C in FIG. 5. Flip-flop 32 is reset when Q is high and P is low. This happens during the half cycle labeled D in FIG. 5. Flip-flop 32 is, thus, reset at a frequency directly proportional to the rotational velocity of structure 10. Thus, at the output of flip-flop 32 at 37 in FIG. 3, there appears a series of pulses, the pulse repetition frequency of which is directly proportional to the speed of the structure 10.

Figure 6:
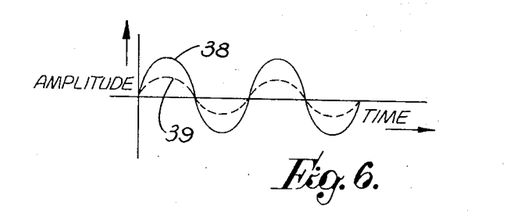
Figure 7:
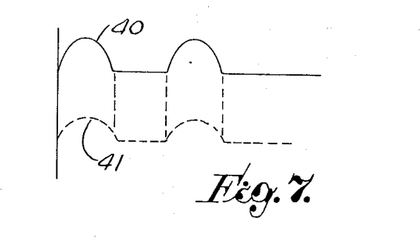

The manner in which the device of the invention discriminates against unwanted induced voltages or noise signals is as follows. If magnets 16 and 17 are subjected to a strong changing magnetic field having a direction the same as that of the axes of magnets 16 and 17, or having a component in that direction, the signals induced in coils 18 and 19 will be in phase as indicated at 38 and 39 in FIG. 6. If these signals are induced in coils 18 and 19, the corresponding outputs from amplifiers 22 and 25 will be as indicated at 40 and 41 in FIG. 7.

Due to the fact that, in this case, P is high when Q is high, and P is low when Q is low, neither of the NAND gates 30 and 31 produce outputs at any time. No pulses are added or substracted to the pulse train generated at flip-flop output 37 which would otherwise cause the production of an erroneous velocity analog.

It is also an advantage of the present invention that due to vibration, or for any other reasons, any axial movement of structure 10 relative to magnets 16 and 17, or vice versa, will induce in-phase voltages in coils 18 and 19. Again, these in-phase voltages will be discriminated against by the logic circuit as explained previously in connection with FIGS. 6 and 7.

A conventional pulse frequency detector may be connected from the output of flip-flop 32 to visually indicate the pulse repetition frequency of the pulses appearing thereat. Alternatively, the pulse output of flip-flop 32 may be employed in a conventional anti-skid braking system on an automotive vehicle.

Coils 18 and 19 are preferebly similar or identical and wound in the same direction, but one may be wound in the reverse direction if its leads are reverse connected.

The magnets 16 and 17 need not be, but preferably are, bar magnets of a uniform cross section. Magnets 16 and 17 have axes parallel to each other and to the rotational axis of shaft 13.

The distance between the magnet axes is preferably $nd$, where $n$ is any positive odd integer, and $d$ is one-half the distance between the centers of two immediately adjacent pair of teeth 11. Preferably, the space between teeth is equal to $d$. Preferably, $n = 1$ to ensure that in-phase vibration or other undesirably induced voltages in coils 18 and 19 are of the same phase and/or amplitude.

Diodes 26 and 27 may be poled in any direction as long as the gating logic is suitable. The same is true as regards the directions of winding and connections of coils 18 and 19.

Figure 2:
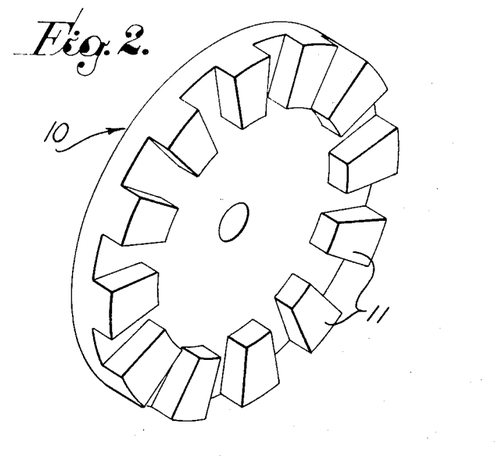
FIG. 2 is a perspective view of a gear-like structure which may be employed with the present invention.

The teeth 11 in FIG. 2 project from a disc having a central cylindrical hole therethrough, the disc being a right cylinder except for the hole. The teeth 11 all have the same nominal width. The nominal spacing between each immediately adjacent pair of teeth is equal to the nominal tooth width. However, each tooth is actually defined by four surfaces. Two surfaces lie in portions of imaginary cylinders concentric to the hole axis. The other two surfaces are flat and lie in imaginary flat planes through the hole axis. For a total of 16 teeth, for example, the flat planes defining any one tooth intersect at an angle of 360 degrees $\div$ (16 teeth + 16 valleys) = (360/32) degrees = 11.25 degrees.

The device of the present invention is by no means limited to the specific form of structure 10 shown in FIG. 2 and described herein. Structure 10 may be any conventional structure.

Although the waveforms of FIGS. 4–7 have been shown approximately sinusoidal, they need not be and generally will not be. They will simply be periodic and alternating.

The dimension A in FIG. 3 is preferably $nd$, where $n = 1$; however, when this description of dimension A or its equivalent is set forth herein and in the claims, it is hereby defined to include any distance except $A = 2nd$.

If coils 18 and 19 are reverse wound and their connections are not reversed, the invention will operate just as well if the logic of gates 30 and 31 is changed to $PQ$ and $\bar{P}\bar{Q}$, respectively.

Diodes 26 and 27 may be omitted entirely if both inverters and both gates are safely insensitive to the negative voltages applied thereto.

The resolution may be doubled by passing the output of flip-flop 32 through a differentiator. The total number of pulses (counting both positive and negative) will, thus, be doubled. Each differentiator output pulse would then correspond to a half tooth movement of the structure 10.

Figure 8:
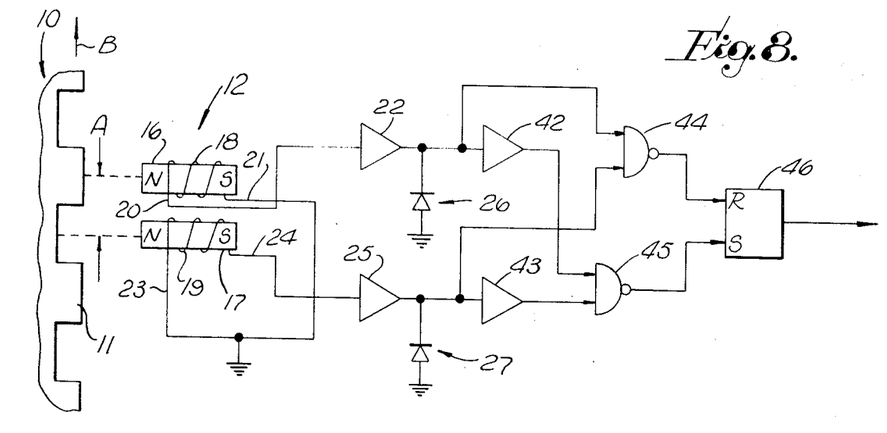
FIGS. 8, 9 and 10 are diagrammatic views of three alternative embodiments of the present invention.

An alternative embodiment of the present invention is shown in FIG. 8. All the structure therein to the left of diodes 26 and 27 is identical to that shown in FIG. 3 except that end turn 21 of coil 18 is grounded instead of connected to amplifier 22, and end turn 20 of coil 28 is connected to amplifier 22 instead of being grounded. Also shown in FIG. 8 are inverters 42 and 43, NAND gates 44 and 45, and a flip-flop 46. The logic of gate 45 is $PQ$. The logic of gate 44 is $\bar{P}\bar{Q}$.

This description contains many details. The invention is by no means limited to these details. The invention has a much broader application to be described.

The invention may be otherwise employed for noise discrimination in a signal transmission system. It is believed that the manner in which discriminating against noise is effected is quite unobvious.

Figure 9:
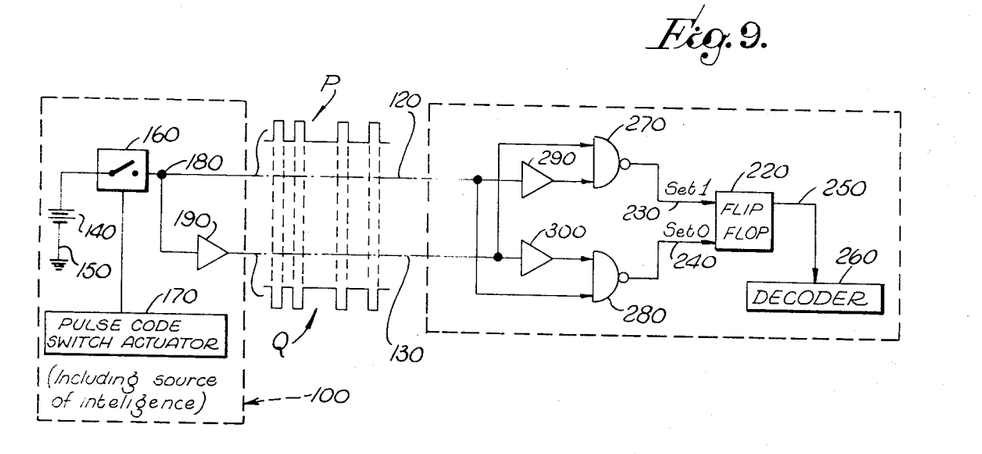

In FIG. 9, one embodiment of the invention is shown including a sending circuit 100 and a receiving circuit 110 connected by two transmission lines 120 and 130.

It is to be understood that the lines 120 and 130 do not form a conventional two-wire transmission line. Note that a battery 140 in circuit 100 has its negative pole grounded at 150. Thus, a three-wire transmission line may be required in some cases. That is, a ground wire may be necessary.

As indicated by the horizontal dotted lines in FIG. 9, the lines 120 and 130, of course, will or may be very long in comparison to the sizes of the blocks 100 and 110, shown in FIG. 9. Lines 120 and 130 may also be very long in comparison to the overall dimensions of the actual equipment represented by blocks 100 and 110.

In FIG. 9, a switch 160 connects battery 140 to transmission line 120 in accordance with the times that it is closed by an actuator 170.

Inside circuit 100, a junction 180 is provided immediately adjacent switch 160. An inverter 190 is connected from junction 180 to line 130.

A flip-flop 220 has a set "1" input 230, a set "0" input 240. Flip-flop 220 also has an output 250 which may be either the "0" or "1" output thereof. Output 250 is connected to a conventional serial pulse decoder 260. NAND gates 270 and 280 have outputs respectively connected to inputs 230 and 240 of flip-flop 220. An inverter 290 is connected from line 120 to one of the inputs of NAND gate 270. An inverter 300 is connected from line 130 to one of the inputs of NAND gate 280. Line 120 is connected to the other input of NAND gate 280. Line 130 is connected to the other input of NAND gate 270.

In accordance with the foregoing, if a signal P is transmitted on line 120, and a signal Q is transmitted on line 130, the logic of NAND gate 270 is $P\overline{Q}$, and the logic of NAND gate 280 is $\overline{P}Q$.

If lines 120 and 130 are kept relatively close together over their entire lengths from circuit 100 to circuit 110, e.g. using twisted pair wire, the noise induced in the lines 120 and 130 will be in phase. However, signal Q is an inverted form of signal P. It is, thus, quite striking that the use of the logic of NAND gates 270 and 280 produces reliable operation. That is, the circuit 110, excluding decoder 260, discriminates against the noise.

Figure 10:
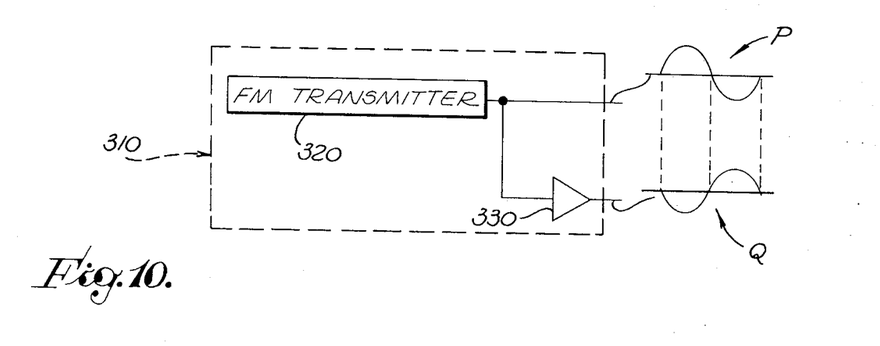

An alternative embodiment is shown in FIG. 10, including a sending circuit 310. The receiving circuit for sending circuit 310 may be identical to receiving circuit 110 when decoder 260 is replaced with a phase detector or frequency discriminator.

In FIG. 10, circuit 310 includes an FM transmitter 320 and an inverter 330, as before. Note this time that signals P and Q are frequency modulated sine waves which are 180 degrees out of phase with each other. Diodes 200 and 210 shunt the negative half cycles of signals P and Q in FIG. 10 to ground. The positive half cycles may be used for the logic with or without squaring up.

Prior art toothed-rotor tachometers are described and illustrated in Handbook of Transducers for Electronic Measuring Systems, by Harry N. Norton, Prentice-Hall, Inc., Englewood Cliffs, N.J. (1969).

The following patents disclose signal transmission systems within the field of the present invention, but these patents do not disclose the invention itself: U. S. Pat. Nos. 1,935,776; 3,349,177; 3,461,390; and 3,594,555.

Note will be taken that if other suitable measures, if needed, are taken, changes in the apparatus of the invention described or illustrated herein can be made. Such changes may be made at least in the following without departing from the invention:

1. The directions of either one or both of the windings of coils 18 and 19 may be reversed.
2. The connections of either one or both of coils 18 and 19 may be reversed.
3. Amplifiers 22 and 25 may:
   a. Both be inverting,
   b. Both be noninverting, or
   c. Either one may be inverting and the other noninverting.
4. The poling of either one or both of the diodes 26 and 27 may be reversed. Alternatively, the poling of only one of the diodes 26 and 27 may be reversed. Which one doesn't matter.
5. The logic P and $\overline{PQ}$ may be used. Alternatively, the logic $P\overline{Q}$ and $\overline{P}Q$ may be used. In FIG. 3, amplifiers 22 and 25 may both be inverting, if desired.

The phrase "approximately in phase" is hereby defined for use herein and in the claims to mean within about ± 90 electrical degrees.

The phrase "approximately 180 degrees out of phase" is hereby defined for use herein and in the claims to mean between about 90 to 270 electrical degrees.

Figure 11:
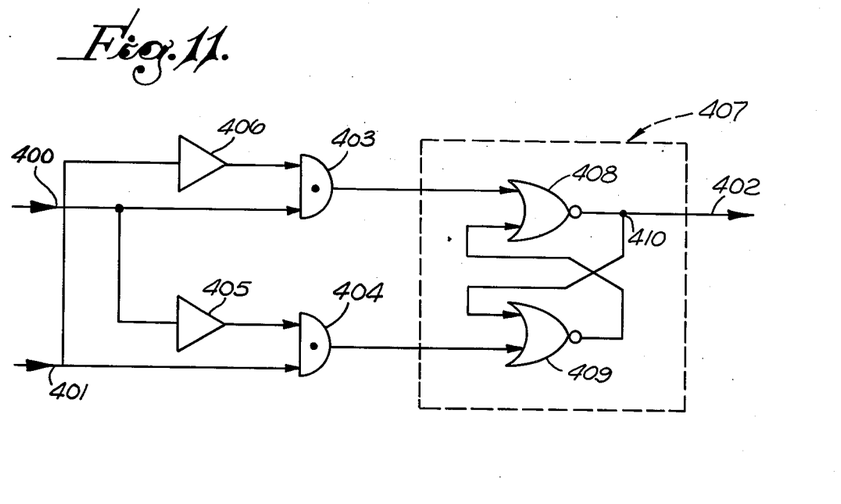
FIG. 11 is a block diagram of an alternative embodiment of the present invention.

The arrangement of FIG. 11 may be substituted for the inverters, NAND gates and flip-flop in each of FIGS. 3, 8 and 9.

In FIG. 11, input leads are provided at 400 and 401, and an output lead is provided at 402. Input lead 400 is connected to one input of an AND gate 403, and to an input of another AND gate 404 through an inverter 405. Similarly, input lead 401 is connected to the other input of AND gate 404 and to the other input of AND gate 403 through an inverter 406.

A flip-flop is provided at 407 including NOR gates 408 and 409 which receive inputs from the outputs of AND gates 403 and 404, respectively. The output of NOR gate 409 is connected to another input of NOR gate 408. Conversely, the output of NOR gate 408 is connected to the other input of NOR gate 409 from a junction 410 with output lead 402, output lead 402 being connected from the output of NOR gate 408 through junction 410.

Unless otherwise provided herein, the claims herein are hereby defined, so that they may or may not include, and not be limited to, two or more permanent magnets or electromagnets at the same or different locations with one or more coils wound on each. The phrase "AND gate" is hereby defined for use herein and for use in the claims to mean either an AND gate or a NAND gate. It will be appreciated by those skilled in the art that NAND gates may, of course, be substituted for AND gates with or without inverters. The reverse is also true. For example, an AND gate may be considered to be a NAND gate followed by an inverter. A NAND gate may be considered to be an AND gate followed by an inverter. However, in many instances, a NAND gate may be substituted for an AND gate without an inverter, and vice versa.

Figure 12:
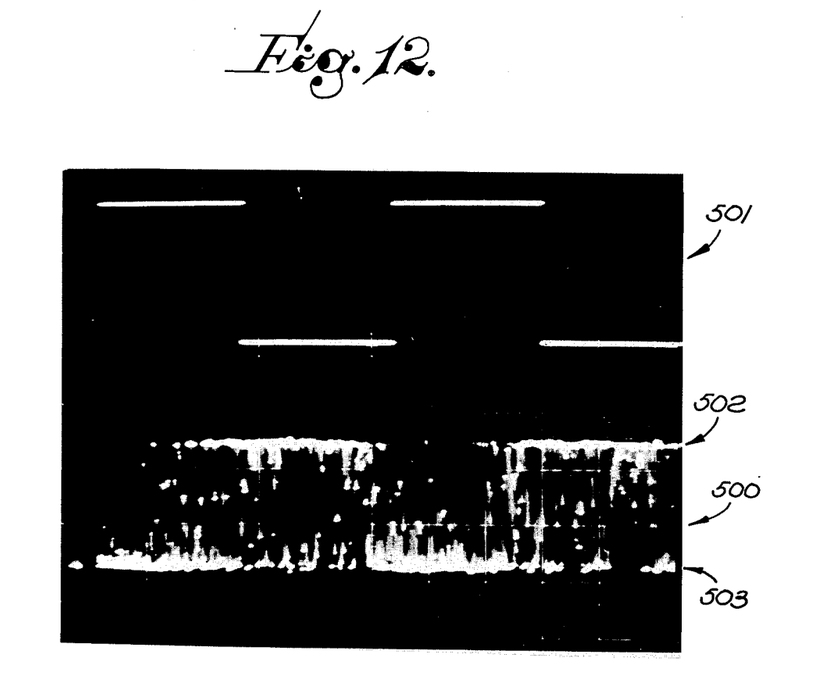
FIG. 12 is a graph of still other waveforms characteristic of the improved operation of the present invention.

FIG. 12 is a graph of waveforms illustrating the exceptionally good utility of the present invention as practiced, in accordance with FIG. 3. With wheel 10 in FIG. 3 rotating, an electric motor was placed in a fixed position adjacent the magnets 16 and 17. With this arrangement, the output of coil 18 was recorded at 500 in FIG. 12. With the output of flip-flop 32 in FIG. 3 connected to the oscilloscope, the waveform 501 was obtained. An oscilloscope was connected also to the output of coil 19. The oscilloscope then again produced the waveform substantially as shown at 500 except that the fundamental of the waveform at the output of coil 19 appeared to be 180 degrees out of phase with that of the waveform 500. That is, the heavier peaks and valleys 502 and 503, respectively, were shifted horizontally about one pulse width.

What is claimed is:

1. Noise discrimination apparatus comprising: first means for producing a first bilevel signal, P, of a predetermined phase and of a predetermined frequency; second means actuable synchronously with said first means to produce a second bilevel signal, Q, of a frequency which is approximately the same as that of said first signal; a flip-flop having a set input and a reset input; first and second inverters having inputs connected from the outputs of said first and second means, respectively, to receive said first and second signals, respectively; and first and second AND gates, each of said AND gates having first and second inputs and an output, the first and second inputs of said first AND gate being connected from said first and second means, respectively, the first and second inputs of said second AND gate being connected from the outputs of said first and second inverters, respectively, the output of said first AND gate being connected to the set input of said flip-flop, the output of said second AND gate being connected to the reset input of said flip-flop.

2. The invention as defined in claim 1, wherein the phase of said second signal is approximately the same as that of said first signal.

3. Noise discrimination apparatus comprising: first means for producing a first bilevel signal, P, of a predetermined phase and of a predetermined frequency; second means actuable synchronously with said first means to produce a second bilevel signal, Q, of a frequency which is the same as that of said first signal; a flip-flop having a set input and a reset input; first and second inverters connected from the outputs of said first and second means, respectively, to receive said first and second signals, respectively; and first and second AND gates, each of said AND gates having first and second inputs and an output, the first inputs of said first and second AND gates being connected from said first and second means, respectively, the second inputs of said first and second AND gates being connected from the outputs of said second and first inverters, respectively, the output of said first AND gate being connected to the set input of said flip-flop, the output of said second AND gate being connected to the reset input of said flip-flop.

4. The invention as defined in claim 3, wherein said second signal is approximately 180 degrees out of phase with said first signal.

5. Apparatus for producing pulses at a repetition rate directly proportional to angular velocity, said apparatus comprising: a base; first and second magnetic pick-ups mounted in a fixed position relative to said base; a movable member rotatably mounted on said base about a first axis; a ferromagnetic armature fixed relative to said movable member in a position to move therewith contiguously past said pick-ups, said armature having a plurality of equally and angularly spaced teeth separated by valleys, all of said teeth being located a predetermined distance from the rotational axis of said armature, said first and second pick-ups including first and second permanent magnets, respectively, the axes of said magnets through the poles thereof being approximately parallel to each other and to said first axis, said teeth projecting toward said magnets in a direction approximately parallel to said first axis, said first and second magnets having first and second coils therearound, the poles of said magnets closest to said teeth being spaced apart in the direction of movement thereof a distance approximately equal to $nd$, where $n$ is any positive odd integer and $d$ is one-half the distance between any two immediately adjacent teeth, first means connected from said first coil to develop a first periodic bilevel signal P responsive to, and in synchronism with, movement of said teeth and said valleys past said first magnet; second means connected from said second coil to develop a second periodic bilevel signal Q responsive to, and in synchronism with, movement of said teeth having inputs and said valleys past said second magnet, said first and second signals having the same frequency; a flip-flop having a set input and a reset input; first and second inverters having inputs connected from the outputs of said first and second means, respectively, to receive said first and second bilevel signals, respectively; said first and second AND gates, each of said AND gates having first and second inputs and an output, the first and second inputs of said first AND gate being connected from said first and second means, respectively, the first and second inputs of said second AND gate being connected from the outputs of said first and second inverters, respectively, the output of said first AND gate being connected to the set input of said flip-flop, the output of said second AND gate being connected to the reset input of said flip-flop.

6. The invention as defined in claim 5, wherein the phase of said second signal is approximately the same as that of said first signal.

7. The invention as defined in claim 6, wherein the same type of pole of each magnet is positioned to have said armature pass contiguous thereto.

8. The invention as defined in claim 7, wherein said first means includes a first inverting amplifier having its input connected from one end of said first coil and its output connected to the input of said first inverter and to said first AND gate first input, a first diode connected from said first amplifier output to ground and poled in a direction away from ground, said second means including a second inverting amplifier having its input connected from one end of said second coil corresponding to said first coil one end, said second amplifier having its output connected to the input of said second inverter and to said first AND gate second input, a second diode connected from said second amplifier output to ground and poled in a direction away from ground, the other ends of said coils being connected to ground, both of said coils being wound in substantially the same way and in the same direction around the respective magnets, both of said magnets being of substantially the same size and shape, said magnets being longitudinally polarized bar-like magnets, each of said armature teeth having a width equal to the distance between two immediately adjacent pair of teeth, $n$ being equal to unity.

9. The invention as defined in claim 8, wherein said bilevel signal frequency is $f$, given by the formula $$f = (RN/60)$$

where, $f$ is in cycles per second, $R$ is the angular velocity of said armature in revolutions per minute, and $N$ is the total number of said teeth.

10. The invention as defined in claim 1, wherein the same type of pole of each magnet is positioned to have said armature pass contiguous thereto.

11. The invention as defined in claim 1, wherein said bilevel signal frequency is $f$, given by the formula $$f = (RN/60)$$

where, $f$ is in cycles per second, $R$ is the angular velocity of said armature in revolutions per minute, and $N$ is the total number of said teeth.

12. Apparatus for producing pulses at a repetition rate directly proportional to angular velocity, said apparatus comprising: a base; first and second magnetic pick-ups mounted in a fixed position relative to said base; a movable member rotatably mounted on said base about a first axis; a ferromagnetic armature fixed relative to said movable member in a position to move therewith contiguously past said pick-ups, said armature having a plurality of equally and angularly spaced teeth separated by valleys, all of said teeth being located a predetermined distance from the rotational axis of said armature, said first and second pick-ups including first and second permanent magnets, respectively, the axes of said magnets through the poles thereof being approximately parallel to each other and to said first axis, said teeth projecting toward said magnets in a direction approximately parallel to said first axis, said first and second magnets having first and second coils therearound, the poles of said magnets closest to said teeth being spaced apart in the direction of movement thereof a distance approximately equal to $nd$, where $n$ is any positive odd interger and $d$ is one-half the distance between any two immediately adjacent teeth, first means connected from said first coil to develop a first periodic bilevel signal P responsive to movement of said teeth and said valleys past said first magnet; second means connected from said second coil to develop a second periodic bilevel signal Q responsive to and in synchronism with movement of said teeth and said valleys past said second magnet, said first and second signals having the same frequency; a flip-flop having a set input and a reset input; first and second inverters having inputs connected from the outputs of said first and second means, respectively, to receive said first and second bilevel signals, respectively; and first and second AND gates, each of said AND gates having first and second inputs and an output, the first inputs of said first and second AND gates being connected from said first and second means, respectively, the second inputs of said first and second AND gates being connected from the outputs of said second and first inverters, respectively, the output of said first AND gate being connected to the set input of said flip-flop, the output of said second AND gate being connected to the reset input of said flip-flop.

13. The invention as defined in claim 12, wherein the phase of said second signal is approximately 180 degrees out of phase with said first signal.

14. The invention as defined in claim 13, wherein the same type of pole of each magnet is positioned to have said armature pass contiguous thereto.

15. The invention as defined in claim 14, wherein said first means includes a first inverting amplifier having its input connected from one end of said first coil and its output connected to the input of said first inverter and to said first AND gate first input, a first diode connected from said first amplifier output to ground and poled in a direction away from ground, said second means including a second inverting amplifier having its input connected from one end of said second coil corresponding to said first coil one end, said second amplifier having its output connected to the input of said second inverter and to said second AND gate second input, a second diode connected from said second amplifier output to ground and poled in a direction away from ground, the other ends of said coils being connected to ground, both of said coils being wound in substantially the same way and in the same direction around the respective magnets, both of said magnets being of substantially the same size and shape, said magnets being longitudinally polarized bar-like magnets, each of said armature teeth having a width equal to the distance between two immediately adjacent pair of teeth, $n$ being equal to unity.

16. The invention as defined in claim 15, wherein said bilevel signal frequency is $f$, given by the formula $$f = (RN/60)$$

where, $f$ is the cycles per second, $R$ is the angular velocity of said armature in revolutions per minute, and $N$ is the total number of said teeth.

17. The invention as defined in claim 12, wherein the same type of pole of each magnet is positioned to have said armature pass contiguous thereto.

18. The invention as defined in claim 12, wherein said bilevel signal frequency is $f$, given by the formula $$f = (RN/60)$$

where, $f$ is the cycles per second, $R$ is the angular velocity of said armature in revolutions per minute, and $N$ is the total number of said teeth.

19. Noise discrimination apparatus comprising: first means for producing a first bilevel signal, P, on an output lead thereof, of a predetermined phase and of a predetermined frequency; second means actuable synchronously with said first means to produce a second bilevel signal, Q, on an output lead thereof, of a frequency which is always the same as that of said first signal, the phase of said second signal being always the same as that of said first signal; an AND gate having first and second input leads; third means connected from said first means output lead to said first gate lead; and fourth means connected from said second means output lead to said second gate lead, said third and fourth means being constructed in a manner such that the logic of said AND gate is one of the logics P$\overline{Q}$ and $\overline{P}$Q.

20. Noise discrimination apparatus comprising: first means for producing a first bilevel signal, P, on an output lead thereof of a predetermined phase and of a predetermined frequency; second means actuable synchronously with said first means to produce a second bilevel signal, Q, on an output lead thereof of a frequency which is always the same as that of said first signal, said second signal always being 180 degrees out of phase with said first signal; an AND gate having first and second input leads; third means connected from said first means output lead to said first gate lead; and fourth means connected from said second means output lead to said second gate lead, said third and fourth means being constructed in a manner such that the logic of said AND gate is one of the logics $P\bar{Q}$ and $\bar{P}Q$.

* * * * *

UNITED STATES PATENT OFFICE
CERTIFICATE OF CORRECTION

Patent No. 3,755,745　　　　　　　Dated August 28, 1973

Inventor(s)　　　Said Sapir

It is certified that error appears in the above-identified patent and that said Letters Patent are hereby corrected as shown below:

Column 8, line 20, delete "having inputs".

Column 8, line 26, delete "said".

Column 9, line 8, replace "1" with --5--.

Column 9, line 11, replace "1" with --5--.

Signed and sealed this 31st day of December 1974.

(SEAL)
Attest:

McCOY M. GIBSON JR.　　　　　　C. MARSHALL DANN
Attesting Officer　　　　　　　Commissioner of Patents

UNITED STATES PATENT OFFICE
CERTIFICATE OF CORRECTION

Patent No. 3,755,745           Dated August 28, 1973

Inventor(s) Said Sapir

It is certified that error appears in the above-identified patent and that said Letters Patent are hereby corrected as shown below:

Column 8, line 20, delete "having inputs".

Column 8, line 26, delete "said".

Column 8, line 52, before "said first" insert --the end opposite--.

Column 9, line 8, replace "1" with --5--.

Column 9, line 11, replace "1" with --5--.

Signed and Sealed this twenty-fifth Day of November 1975

[SEAL]

Attest:

RUTH C. MASON
Attesting Officer

C. MARSHALL DANN
Commissioner of Patents and Trademarks